(No Model.)
O. H. McKELDIN.
SPINDLE AND BEARING THEREFOR.
No. 357,847. Patented Feb. 15, 1887.
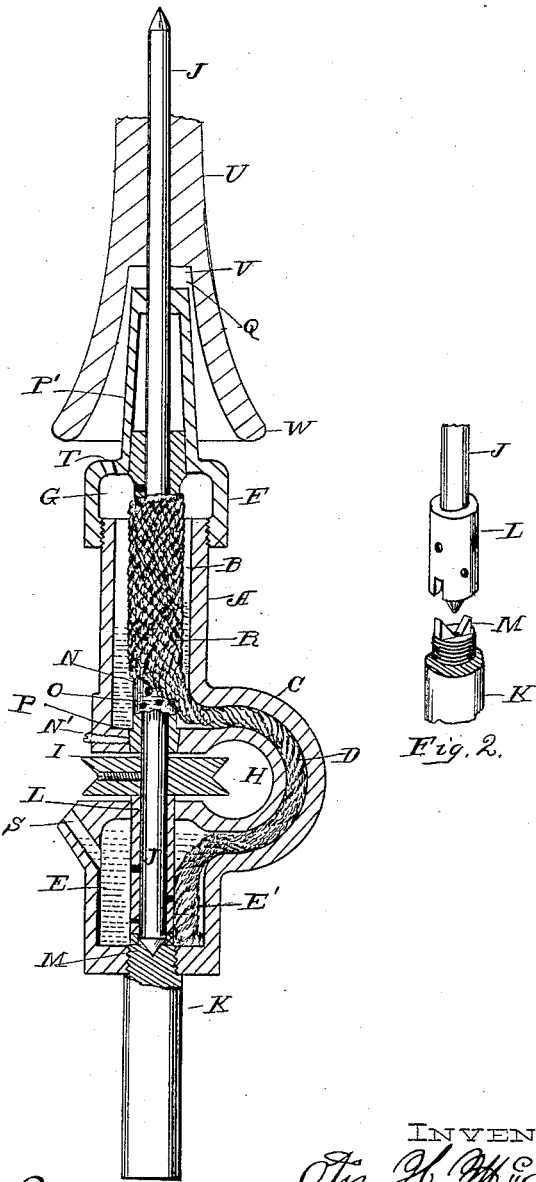

UNITED STATES PATENT OFFICE.

OTIS H. McKELDIN, OF LOUISVILLE, KENTUCKY.

SPINDLE AND BEARING THEREFOR.

SPECIFICATION forming part of Letters Patent No. 357,847, dated February 15, 1887.

Application filed May 1, 1886. Serial No. 200,812. (No model.)

*To all whom it may concern:*

Be it known that I, OTIS H. McKELDIN, of Louisville, in the county of Jefferson and State of Kentucky, have invented a new and useful Improvement in Spindles and Bearings Therefor, which improvement is fully set forth in the following specification and accompanying drawings, in which—

Figure 1 is a sectional view showing the spindle, its bearings, and part of a bobbin thereon. Fig. 2 is a detailed perspective view, showing the spindle seat or step, the lower end of the spindle, and the bearing-tube therefor.

In my invention the spindle-bearing is formed with upper and lower portions joined together by a hollow arm containing a wick, connecting oil-reservoirs in the opposite bearing portions, so that when the oil is exhausted in one of the reservoirs it may be supplied from the other. The bearing is provided with the ordinary oil-apertures, and a single filling of the reservoirs will last for months. In addition, the spindle has the band pull or whirl thereof disposed between the bearing portions, instead of, as usual, having it above the bearings or supporting-rails, which obviates any tendency of the spindle to get out of line. In addition to these features, an upwardly-projecting supplementary bearing prevents the spindle from becoming bent or twisted in removing the bobbin therefrom, all of which will now be fully set forth in detail.

In the accompanying drawings, A represents a spindle-bearing, one end formed hollow, as shown at B, having the connecting-arm C, also formed with the passage D therein. The lower end, E, of this bearing A is chambered, forming a reservoir, E', while the upper end of this bearing A is also provided with a cap, F, forming a reservoir, G, connecting with the opening B, the tube D, and the reservoir E'. An opening, H, between the opposite ends of the bearing-piece A, opposite the arm C, is of such a size as to admit a grooved whirl, I, secured by means of a set-screw to the spindle J, the spindle being disposed centrally through the bearing A. The lower end of the spindle J is designed to rest within the upper end of the step K, which is provided with a thread connecting with the threaded opening in the lower end of the reservoir E'. The lower end of the spindle J is incased within a perforated tube, L, resting within the oil-reservoir E', and this tube in turn engages with the upper end of the step K, by means of the lug M on the latter, to prevent its turning except in connection with the step K. The entire length of the said tube extending to the whirl I forms the bearing for the lower end of the spindle J. In some cases I desire to dispense with the lugs M as inconvenient, and at such times I secure the tube L in position by means of a set-screw, to correspond with the set-screw N', securing the top tube, N, in position.

The upper side of the cap F is projected upwardly, as at P', surrounding the spindle J, and its upper portion is formed to act as a supplementary bearing, Q, for the spindle, to prevent it from vibration or from becoming bent when the bobbin is removed therefrom. The part of the spindle within the bearing A, oppositely from the tube L, is also provided with a second tube, N, preferably having perforations O therein, the end P next to the whirl I fitting rigidly within the central opening of the bearing A, and has a set-screw, N', passing through the bearing A, so as to secure it rigidly in position. The opposite end is disposed so as to fit and have a bearing within the portion P' of the cap F.

Surrounding the tube N, I provide a wick, R, resting at its upper end within the reservoir G, extending down and through the passage D in the connecting-arm C, and terminating within the reservoir E' in close contact with the tube L. The oil-reservoir E' is provided with an oil-tube, S, and the reservoir G is also provided with an oil-tube, T, so that these reservoirs may be thus supplied with oil.

The upper end of the spindle J is designed to receive the bobbin U. The lower end of the bobbin U is designed to have an enlarged opening, V, therein, with the lower end, W, flaring outwardly, so that it may come down close to the reservoir F, embracing the supplementary bearing Q without coming in contact therewith. This brings the center of the bobbin down close to the supplementary bearing Q.

As will be noticed, the spindle J has two main bearings formed by the tubes L and N, oppositely disposed on the spindles on opposite sides of the whirl I, which prevents the spindle from getting out of line with the thread-guide above, as is usually the case where the whirl is above the bearings therefor through the supporting-rails, and in addition to this feature the upwardly-projecting supplementary bearing Q acts as a bearing in case the spindle has a tendency to vibrate.

The operation of this device is as follows: The spindle J, having thereon the bobbin U, rests on the step K, and has the tubes L and N as bearings. These bearings, being within the reservoirs G and E', are lubricated therefrom through the openings in the said tubes. The reservoirs E' and G are filled with oil, and, as described, are connected by the passage D, through which the wick passes. As the reservoir G will necessarily be first emptied, the oil will be fed upwardly from the lower reservoir, E', by means of the wick R, so that, as will be readily noticed, a single supply of oil will last for a great length of time, which would not be possible in the ordinary reservoir, the reservoir E' thus acting as a supplementary reservoir to the device.

Having described my invention, what I claim as new is—

1. The combination, with the spindle J, having a whirl, of the spindle-bearing formed with two bearing portions on opposite sides of the whirl, oil-reservoirs in said bearing portions, and a tubular arm and wick, substantially as described.

2. The combination, with the spindle J, having a whirl, of the spindle-bearing formed with two bearing portions on opposite sides of the whirl, perforated journal-tubes, oil-reservoirs in said bearing portions, and a tubular arm and wick, substantially as described.

3. The combination of the bearing A, having arm C, the reservoirs E' and G, and the connecting-passage D through the arm C, and wick R, with the spindle J and whirl I, substantially as herein set forth.

4. The combination of the spindle J and whirl I with the bearing A, having arm C, and oil-reservoirs E' and G, perforated sleeves L and N, and the wick R, substantially as described.

In testimony that I claim the foregoing I have hereunto set my hand, this 10th day of March, 1886, in the presence of witnesses.

OTIS H. McKELDIN.

Witnesses:
DUGALD McKILLOP,
C. D. ZERBE.